(12) United States Patent
Garzon et al.

(10) Patent No.: US 7,736,547 B2
(45) Date of Patent: Jun. 15, 2010

(54) METHOD OF SYNTHESIS OF PROTON CONDUCTING MATERIALS

(75) Inventors: Fernando Henry Garzon, Santa Fe, NM (US); Melinda Lou Einsla, Los Alamos, NM (US); Rangachary Mukundan, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 28 days.

(21) Appl. No.: 12/075,356

(22) Filed: Mar. 11, 2008

(65) Prior Publication Data

US 2009/0230365 A1 Sep. 17, 2009

(51) Int. Cl.
*H01B 1/06* (2006.01)
*H01M 6/18* (2006.01)
*H01M 8/10* (2006.01)

(52) U.S. Cl. .............................. 252/520.1; 252/519.14; 252/521.5; 252/500; 252/521.6; 429/314; 429/33; 423/89; 423/112; 423/111; 423/115

(58) Field of Classification Search .............. 252/520.1, 252/519.14, 521.5, 500, 521.6; 429/314, 429/33; 423/89, 112, 111, 115
See application file for complete search history.

(56) References Cited

U.S. PATENT DOCUMENTS

| 7,118,821 B2 * | 10/2006 | Hong et al. .................... 429/33 |
| 2004/0023174 A1 | 2/2004 | Ohzeki et al. |
| 2005/0221143 A1 | 10/2005 | Kwon et al. |
| 2006/0148953 A1 * | 7/2006 | Hong et al. .................. 524/431 |

FOREIGN PATENT DOCUMENTS

JP 2006-289345 * 10/2006

OTHER PUBLICATIONS

Heo et al., Performance of an Intermediate-Temperature Fuel Cell Using a Proton-Conducting Sn0.9In0.1P2O7 Electrolyte, Journal of the Electrochemical Society, 153(5), A897-A901 (2006).*

Nagao et al., Proton Conduction in In3+Doped SnP2O7 at Intermediate Temperatures, Journal of the Electrochemical Society, 153(8), A1604-A1609 (2006).*
Einsla et al., Synthesis and conductivity of indium-doped tin pyrophosphates, ECS Transactions (Oct. 2007), 11 (1, Part 1, Proton Exchange Membrane Fuel Cells 7, Part 1), 347-355.*
Einsla, M. L. et al., "Synthesis and Conductivity of Indium-Doped Tin Pyrophosphates", ECS Transactions, 11 (1), 347-355, Oct. 2007.*
Norby, "The Promise of Protonics," Nature, v. 410, pp. 877-878 (Apr. 2001).
Norby, "Solid-state Protonic Conductors: Principles, Properties, Progress and Prospects" Solid State Ionics, v. 125, pp. 1-11 (1999).
Kreuer, "Proton Conductivity: Materials and Applications," Chem. Mater., v.8, No. 3, pp. 610-641 (1996).
Baranov et al., "Superion Conductvity and Phase Transitions in $CsHSO_4$ and $CsHSeO_4$ Crystals," JETP Lett., v. 36, No. 11, pp. 459-462 (Dec. 1982).
Haile et al., "Solid Acids as Fuel Cell Electrolytes", Nature, vol. 410, pp. 910-913, (Apr. 2001).
Boysen et al., "High-Performance Solid Acid Fuel Cells Through Humidity Stabilization", Science, vol. 303, pp. 68-70, (Jan. 2004).
Nagao et al., "A Proton-Conducting $In^{3+}$-Doped $SnP_2O_7$ Electrolyte for Intermediate-Temperature Fuel Cells", Electrochemical and Solid-State Letters, vol. 9, pp. A105-A109 (2006).
Gover et al., "Structure and Phase Transitions of $SnP_2O_7$", J. of Solid State Chemistry, v. 166, pp. 42-48 (2002).
Attidekou et al., "Thermodynamic Aspects of the Reaction of Lithium with $SnP_2O_7$ Based Positive Electrodes", J. of the Electrochemical Society, v. 154, pp. A217-A220, (2007).
Huang et al., "Pyrophosphates of Tetravalent Elements and a Mössbauer Study of $SnP_2O_7$", Canadian Journal of Chemistry, vol. 53, pp. 79-91, (1975).
Kresse, "Efficient Iterative Schemes for ab initio Total-Energy Calculations Using a Plane-Wave Basis Set", Physical Review B, vol. 54, No. 16, pp. 11169-11186, (Oct. 1996).

* cited by examiner

*Primary Examiner*—Douglas McGinty
(74) *Attorney, Agent, or Firm*—Juliet A. Jones

(57) ABSTRACT

A method of producing a proton conducting material, comprising adding a pyrophosphate salt to a solvent to produce a dissolved pyrophosphate salt; adding an inorganic acid salt to a solvent to produce a dissolved inorganic acid salt; adding the dissolved inorganic acid salt to the dissolved pyrophosphate salt to produce a mixture; substantially evaporating the solvent from the mixture to produce a precipitate; and calcining the precipitate at a temperature of from about 400° C. to about 1200° C.

14 Claims, 2 Drawing Sheets

US 7,736,547 B2

METHOD OF SYNTHESIS OF PROTON CONDUCTING MATERIALS

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD OF THE INVENTION

The present invention relates to a method of synthesis of proton conducting materials for use, for example, in fuel cells.

BACKGROUND OF THE INVENTION

Proton conducting membranes and fuel cells are expected to play a very important role in the future of power generation. Some examples of fuel cells include solid oxide fuel cells, polymer electrolyte membrane fuel cells, and molten carbonate and phosphoric acid fuel cells. The cost of solid oxide fuel cells is extremely high due to their elevated operating temperature (>600° C.), which requires the use of expensive materials able to withstand such high temperatures. Polymer electrolyte membrane fuel cells operate below 100° C., however require the use of platinum catalysts that are both expensive and easily contaminated. Operation below 100° C. also produces liquid water as a byproduct that severely limits fuel cell performance as it impedes gas diffusion to the charge transfer interface. Therefore the discovery of proton conductors capable of operating between 100° C.-600° C. has been an important goal in fuel cell research. FIG. 1 illustrates some available proton conductors and their conductivity plotted versus temperature. A gap in the availability of materials that conduct protons at temperatures of from about 100° C.-600° C. is noticeable.

Oxoacids and their salts have been known to exhibit anhydrous protonic conduction above the boiling point of water. However, most oxoacids have very low conductivities. One exception is $CsHSO_4$, which has a conductivity of $10^{-3}$-$10^{-2}$ S/cm, where S means Siemens, at a temperature of 141° C. Although the use of a $CsHSO_4$ electrolyte in a fuel cell was demonstrated, the material is water soluble, is easily reduced under hydrogen conditions, and thus unstable under normal fuel cell operating conditions. Phosphates, for example $CsH_2PO_4$, have been used as electrolytes and show good stability up to 250° C. in humid conditions. However, the conductivity of these materials is at least an order of magnitude too low with a very narrow temperature range of operation. In addition, phosphates such as $CsH_2PO_4$ cannot operate without the presence of water.

Recently it was reported that $SnP_2O_7$ and $Sn_{0.9}In_{0.1}P_2O_7$ have excellent protonic conductivity ($10^{-1}$ S/cm) at 80-300° C., and exhibit a gradual increase in conductivity from 80° C. to 300° C. In addition, it was reported that these materials are stable and highly conductive in the anhydrous state, and do not appear to exhibit a superprotonic transition. However, methods for preparing $SnP_2O_7$ have included mixing a Sn-containing salt or oxide with phosphoric acid and calcining (or heating) the mixture at a high temperatures ($\geq 600°$ C.), which forms a $SnP_2O_7$ phase by evaporation of the excess $P_2O_5$. In this process it is difficult to control and reproduce the Sn/P ratio, with the only control being the temperature and time of calcination. A currently accepted method of preparing $Sn_{0.9}In_{0.1}P_2O_7$ includes evaporating a mixture with excess phosphorous, carefully controlling a variety of reaction conditions such as sample size, crucible shape and heating and cooling rates, and consistently selecting only the portion of sample in the middle of the evaporated product as a means of controlling the consistency of the stoichiometry of the tin and indium.

Thus, a need exists a method of making materials that have high proton conductivity at a temperature range of from about 100° C.-600° C., which do not produce water as a byproduct during operation, and which allows improved reproducibility of the Sn/P ratio and the Sn/In ratio.

SUMMARY OF THE INVENTION

The present invention provides a method of synthesizing proton conducting materials which meets the aforementioned needs. According to one non-limiting embodiment, the method of the present invention comprises adding a pyrophosphate salt to a solvent to produce a dissolved pyrophosphate salt; adding an inorganic acid salt to a solvent to produce a dissolved inorganic acid salt; adding the dissolved inorganic acid salt to the dissolved pyrophosphate salt to produce a mixture; substantially evaporating the solvent from the mixture to produce a precipitate; and calcining the precipitate at a temperature of from about 400° C. to about 1200° C.

The method of the present invention provides several advantages, in particular over high-temperature (typically at least 1200° C.) methods of synthesis of these materials. For example, the loss of phosphorus at such high temperatures may result in a change of stoichiometry. To overcome this effect, an excess of phosphorus typically is added at the beginning of the synthesis, which results in a trial and error approach to achieving the proper stoichiometry. In addition to more reproducible stoichiometry, the present method provides improved uniformity of the final product, and avoidance of the evaporation of excess $P_2O_5$, which is corrosive and may require special handling and disposal.

DETAILED DESCRIPTION OF THE INVENTION

Figure 1:
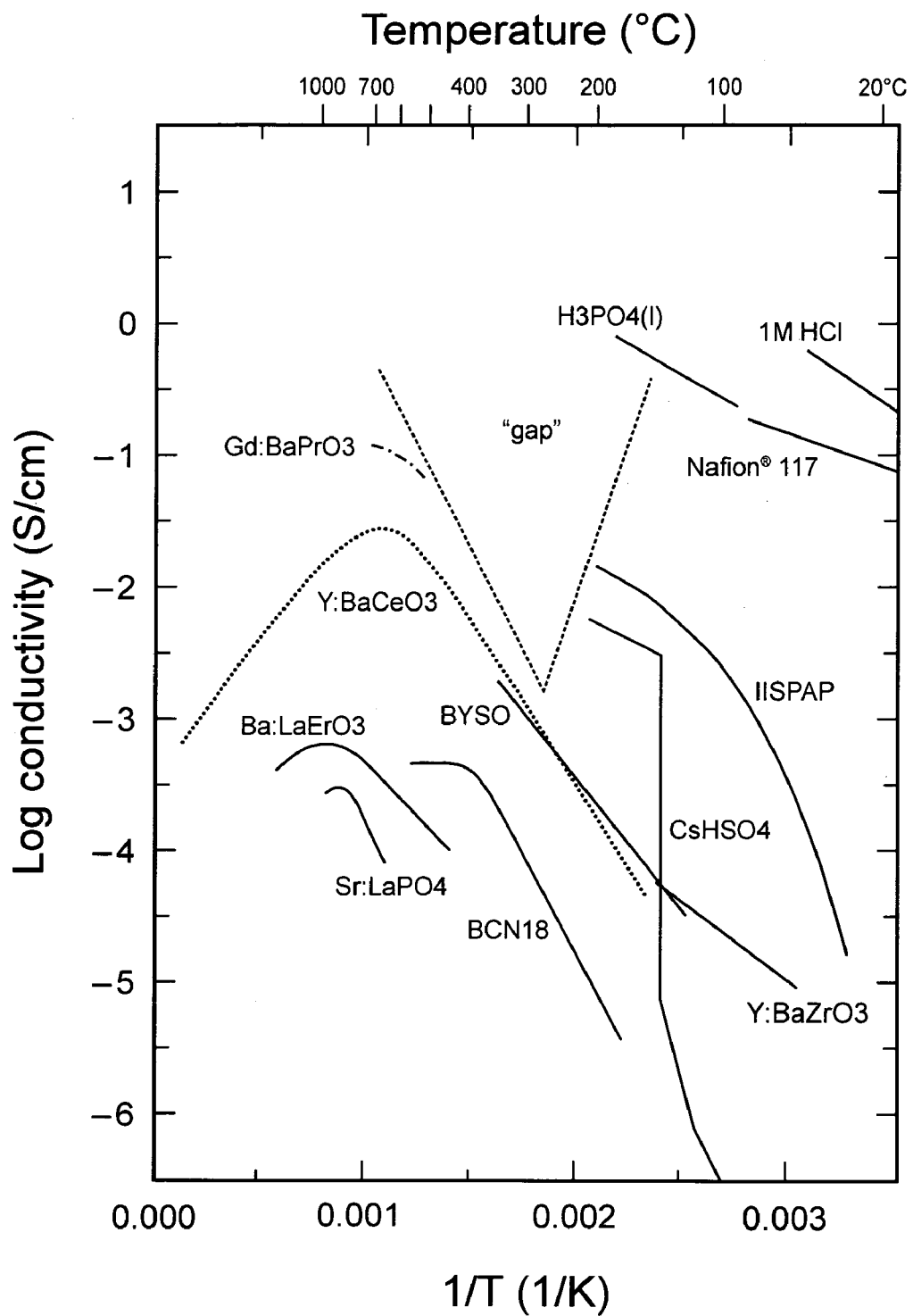
FIG. 1 depicts conductivities of proton conductors other than $SnP_2O_7$ and the dearth of materials suitable for conducting protons in the range of about 100° C.-600° C.
Figure 2:
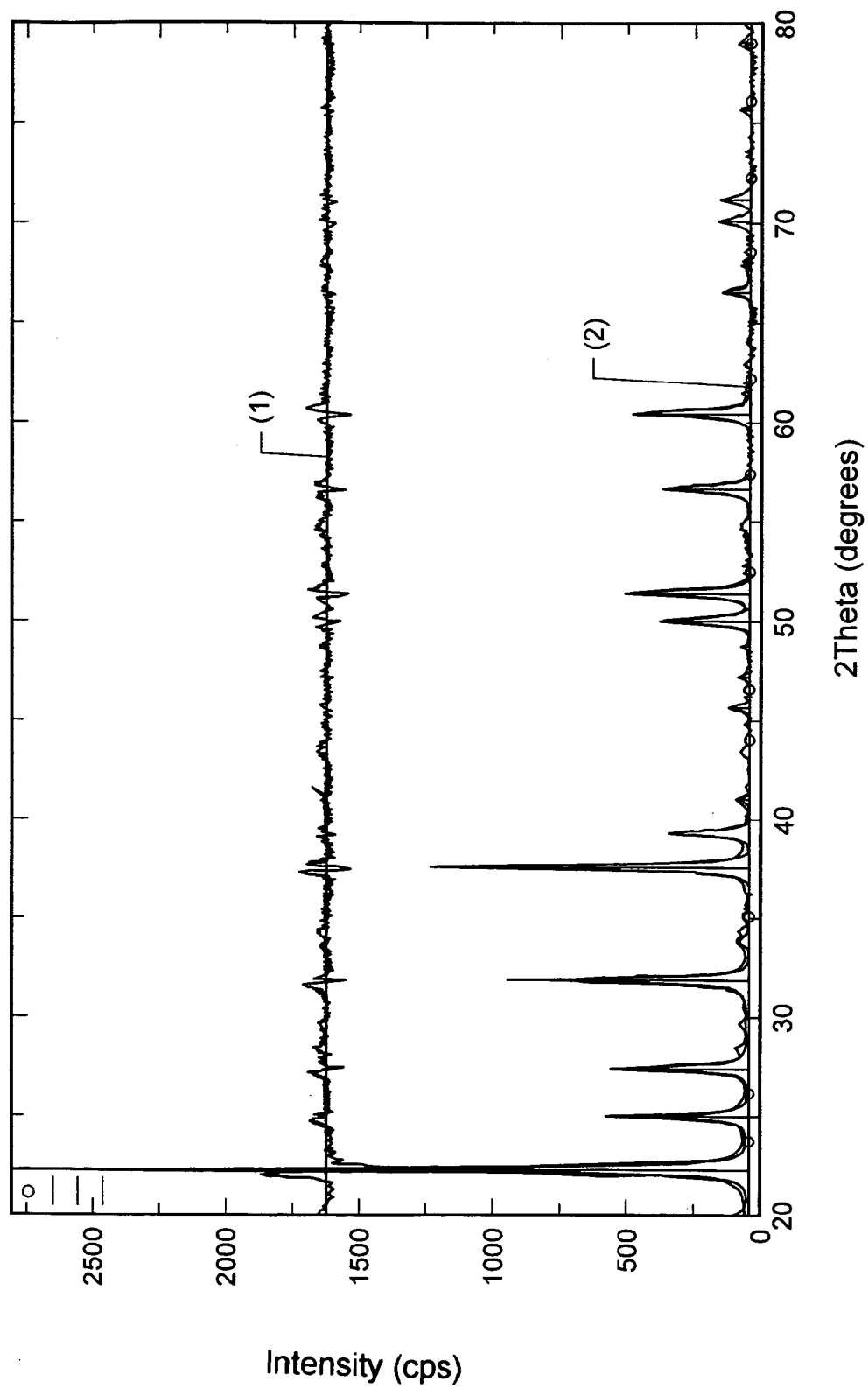
FIG. 2 depicts an X-ray diffraction pattern of $SnP_2O_7$ prepared by a method of the present invention, where line (1) is the reference pattern and line (2) is the pattern of the $SnP_2O_7$.

The present method describes a method of producing proton conducting materials. In all embodiments of the present invention, all percentages are by weight of the total composition, unless specifically stated otherwise. All ranges are inclusive and combinable. The number of significant digits conveys neither a limitation on the indicated amounts nor on the accuracy of the measurements. All numerical amounts are understood to be modified by the word "about" unless otherwise specifically indicated.

Herein, "calcining" means to heat to within an indicated temperature range until substantially all solvent is evaporated and the non-volatile material is crystallized.

Herein, "substantially evaporating the solvent" means that no solvent remains visible to the naked eye in a sample. In one embodiment, "substantially evaporating the solvent" means heating the sample to a temperature of about 100° C. for a period of about 24 hours.

Herein, "substantially free from water during use," specifically when referring to a given temperature range, means that essentially no water is generated by the proton conducting membrane, and that any water that is generated is incidental and does not affect the intended function of the proton conducting material to any measurable extent.

The method of the present invention comprises adding a pyrophosphate salt to a solvent to produce a dissolved pyrophosphate salt. Suitable pyrophosphate salts include, but are not limited to pyrophosphate salts having a structure $M_4P_2O_7$, wherein M is a monovalent cation and may be selected from the group consisting of $H^+$, $K^+$, $NH_4^+$, or combinations thereof (pyrophosphoric acid, potassium pyrophosphate and ammonium pyrophosphate, respectively). Other examples of suitable pyrophosphate salts are described in R. K. B. Gover, N. D. Withers, S. Allen, R. L. Withers, and J. S. O. Evans: "Structure and phase transitions of $SnP_2O_7$"; Journal of Solid State Chemistry, V166, p42-48 (2002), the relevant portions of which are incorporated herein by reference, and include pyrophosphate salts of the formula $AM_2O_7$ where A is selected from the group consisting of Ti, Zr, Hf, Mo, W, Re, Si, Ge, Pb, Sb, Ce, Th, U, Np, Pu and combinations thereof, and M is selected from the group consisting of V, P, As, Ti, Zr and combinations thereof. In one embodiment, M is P and A is selected from the group consisting of Zr, Hf, Mo, W, Re, Pb, Sb, Ce and combinations thereof.

The solvent to which the pyrophosphate salt is added may be any solvent that substantially dissolves the pyrophosphate salt and is compatible with the method described herein. Herein, "substantially dissolved" means that no salt is visible to the naked eye after mixing. In one embodiment, the solvent is water.

The present invention comprises the step of adding an inorganic acid salt to a solvent to produce a dissolved inorganic acid salt. Non-limiting examples of suitable inorganic salts are salts comprising indium, tin, or combinations thereof. In one embodiment, the salt is selected from the group consisting of $In(NO_3)_3$, $SnCl_4$, $AlCl_3$ and combinations thereof.

In one embodiment, the inorganic salt may be doped with from about 2% to about 20% of a dopant. The purpose of the dopant is to substitute a portion of $Sn^{4+}$ with a trivalent cation to create negatively charged "defects." These defects are then compensated by the positively charged proton which leads to higher protonic conductivity. In some cases these defects can segregate to the grain boundaries and can thus lead to enhanced grain boundary proton conduction. In one embodiment, the trivalent cation is $Al^{+3}$.

The present invention comprises the step of adding the dissolved inorganic acid salt to the dissolved pyrophosphate salt to produce a mixture. The addition may be performed manually or with an automated instrument, and is performed at a sufficiently slow rate to ensure precipitation. In one embodiment, the addition is performed dropwise. The method further comprises the step of evaporating the solvent from the precipitated mixture. By "substantially evaporating the solvent" is meant herein is that no solvent remains visible to the naked eye. By way of non-limiting example only, the solvent may be evaporated for a period of about 24 hours, at a temperature of about 100° C. In one embodiment, the solvent is evaporated for a period of from about 12 hours to about 24 hours at a temperature of from about 80° C. to about 120° C.

The present invention comprises the step of calcining the precipitate produced by substantially evaporating the solvent at a temperature of from about 400° C. to about 1200° C. In one embodiment, the calcining procedure is initiated at a temperature of about 400° C., whereafter the temperature is slowly increased to a temperature of about 1200° C. or less. In one embodiment, the mixture is calcined at a temperature of from about 400° C. to about 800° C. In one embodiment, the mixture is calcined at a temperature of from about 800° C. to about 1200° C.

Some non-limiting examples of proton conducting materials produced by the method described herein comprise $SnP_2O_7$, $Sn_xIn_{1-x}P_2O_7$, or combinations thereof, wherein x has a value of from about 0.02 to about 0.2.

The proton conducting material may have a conductivity of at least 0.1 S/cm at a temperature of from about 100° C.-600° C., where S means "Siemens." Alternatively, the conductivity may be from about 0.1 S/cm to about 0.0001 S/cm, and alternatively may be from about 0.1 S/cm to about 0.01 S/cm.

In one embodiment, the proton conducting material is substantially free from water during use at a temperature of from about 100° C.-600° C.

The proton conducting material may be in the form of a crystal having an average diameter of from about 5 nm to about 50 nm. When the crystal comprises e.g. $SnP_2O_7$, the average diameter may be from about 10 nm to about 25 nm, and alternatively may be from about 15 nm to about 25 nm. When the crystal comprises e.g. $Sn_xIn_{1-x}P_2O_7$, the average diameter may be from about 10 nm to about 20 nm, and alternatively may be about 15 nm.

EXAMPLES

The following describes one non-limiting procedure for synthesizing $Sn_{0.9}In_{0.1}P_2O_7$ using potassium pyrophosphate as a reagent: Dissolve tin(IV) chloride pentahydrate (0.2760 g, 0.7872 mmol) and indium(III) nitrate pentahydrate (0.0342 g, 0.08747 mmol) in deionized water (3.1 mL). Separately, dissolve potassium pyrophosphate (0.4333 g, 0.8744 mmol) in deionized water (4.3 mL). Add the tin/indium solution dropwise to the potassium pyrophosphate solution with stirring. Allow the resulting clear solution to rest at room temperature until a gel is formed. Evaporate the solvent by drying the gel at about 140° C. in an air atmosphere for about 24 hours, and ground into a fine powder. Alternatively, the samples may be washed in boiling water by Sohxlet extraction and redried at 140° C. Calcine the samples starting at a temperature of about 500° C. and continue to raise the temperature as needed up to about 1200° C.

The crystallization temperature of the precipitate as determined by differential scanning calorimetry (DSC) was <550° C. A variety of different pyrophosphate salts may be employed in this synthesis as starting materials, including potassium pyrophosphate, ammonium pyrophosphate, and pyrophosphoric acid. The starting material has been found to affect the properties of the product, such as required calcination temperature and final product composition. Use of pyrophosphoric acid as a starting material resulted in an essentially pure tin pyrophosphate phase at 1200° C. Use of ammonium pyrophosphate as a starting material resulted in essentially pure tin pyrophosphate phase obtained at a calcining temperature of about 500° C., with no evidence of the presence of tin oxide. The average size of the resulting crystalline material calcined at 600° C. was about 30 nm.

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

Whereas particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of producing a proton conducting material, comprising:
   a) adding a pyrophosphate salt to a solvent to produce a dissolved pyrophosphate salt;
   b) separately adding an inorganic acid salt to a solvent to produce a dissolved inorganic acid salt;
   c) adding the dissolved inorganic acid salt to the dissolved pyrophosphate salt to produce a mixture;
   d) substantially evaporating the solvent from the mixture to produce a precipitate; and
   e) calcining the precipitate at a temperature of from about 400° C. to about 1200° C. to produce the proton conducting material.

2. The method of claim 1 wherein the pyrophosphate salt has a structure $M_4P_2O_7$, wherein M is a monovalent cation.

3. The method of claim 2, wherein M is $H^+$, $K^+$, $NH_4^+$, or combinations thereof.

4. The method of claim 3, wherein the inorganic acid salt comprises indium, tin, or combinations thereof.

5. The method of claim 1, wherein the inorganic acid salt comprises $In(NO_3)_3$, $SnCl_4$, $AlCl_3$ and combinations thereof.

6. The method of claim 4, wherein the inorganic acid salt is $In(NO_3)_3$.

7. The method of claim 4, wherein the inorganic acid salt is $SnCl_4$.

8. The method of claim 1, wherein the proton conducting material is $SnP_2O_7$, $Sn_xIn_{1-x}P_2O_7$, or combinations thereof.

9. The method of claim 8, wherein x has a value of from about 0.02 to about 0.2.

10. The method of claim 1, wherein the solvent is evaporated for a period of from about 12 hours to about 24 hours at a temperature of from about 80° C. to about 120° C.

11. The method of claim 1, wherein the proton conducting material has a conductivity of at least 0.1 S/cm at a temperature of from about 100° C.-600° C.

12. The method of claim 1, wherein the proton conducting material is substantially free from water during use at a temperature of from about 100° C.-600° C.

13. The method of claim 1, wherein the proton conducting material is in the form of a crystal.

14. The method of claim 13, wherein the crystal has an average diameter of from about 5 nm to about 50 nm.

* * * * *